United States Patent
Sasaki

(10) Patent No.: US 7,005,022 B2
(45) Date of Patent: Feb. 28, 2006

(54) METHOD OF MANUFACTURING STRIP OF UNVULCANIZED RUBBER COMPOUND

(75) Inventor: Kyoko Sasaki, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 216 days.

(21) Appl. No.: 10/205,360

(22) Filed: Jul. 26, 2002

(65) Prior Publication Data

US 2003/0020197 A1 Jan. 30, 2003

(30) Foreign Application Priority Data

Jul. 27, 2001 (JP) ........................................ 2001-228201

(51) Int. Cl.
*B29C 35/00* (2006.01)

(52) U.S. Cl. .................... 156/110.1; 264/108; 264/156; 264/326; 264/211.12

(58) Field of Classification Search ................. 264/108, 264/122, 154, 155, 156, 326, 176.1, 210.1, 264/211.12; 156/110.1, 128.6; 152/209.4

See application file for complete search history.

(56) References Cited

U.S. PATENT DOCUMENTS 3,901,961 A * 8/1975 Goerter et al. .............. 264/108
6,374,885 B1 * 4/2002 Uchida et al. ........... 152/209.4

FOREIGN PATENT DOCUMENTS

| EP | 1 097 825 A2 | 5/2001 |
| JP | 4-174758 | * 6/1992 |
| JP | 07-024932 A | 1/1995 |
| JP | 7-286514 | * 10/1995 |
| JP | 2001-130228 A | 5/2001 |

* cited by examiner

*Primary Examiner*—Mathieu D. Vargot
(74) *Attorney, Agent, or Firm*—Birch, Stewart, Kolasch & Birch, LLP

(57) ABSTRACT

A method of manufacturing a strip of unvulcanized rubber compound including short fibers oriented towards specific directions is disclosed, and the method comprises: extruding a mixture of unvulcanized rubber and short fibers to form a strip of the mixture and to orient the short fibers towards the extruding direction; and piercing the strip with needles in a thickness direction of the strip to orient the short fibers towards the piercing direction.

6 Claims, 5 Drawing Sheets

METHOD OF MANUFACTURING STRIP OF UNVULCANIZED RUBBER COMPOUND

This application claims priority under 35 U.S.C. § 119 of Japanese application no. 2001-228201, filed Jul. 27, 2001, the entire contents of which is hereby incorporated by reference.

BACKGROUND OF THE INVENTION

1. Field of the Invention

The present invention relates to a method of manufacturing a strip of unvulcanized rubber compound with short fibers mixed therein, more particularly to a method of orienting short fibers towards at least two directions.

2. Description of the Related Art

In a pneumatic tire called studless tire, in order to increase the frictional coefficient on the ice-covered road surface, the use of tread rubber including short fibers oriented in the radial direction of the tire has been proposed. In the laid-open Japanese patent application JP-A-2001-130228, such a tire is disclosed, wherein the tread rubber is, as shown in FIG. 7, made by accordion-folding a very thin sheet (a) of unvulcanized rubber with short fibers oriented towards the normal direction to the folding direction. In this case, almost all of the short fibers (f) are oriented in one direction, namely, the tire radial direction, therefore, the frictional coefficient is efficiently increased. But, it is difficult to make use of the short fibers for the propose of reinforcing the tread rubber. If short fibers are oriented towards the tire circumferential direction, the tread rubber may be reinforced.

SUMMARY OF THE INVENTION

It is therefore, an object of the present invention to provide a method of manufacturing a strip of unvulcanized rubber compound with short fibers mixed therein, in which the short fibers are oriented towards at least two directions, therefore, by using such strip as the tread rubber of a tire it becomes possible not only to increase the frictional coefficient on the ice-covered road surface but also to reinforce the tread rubber.

According to the present invention, a method of manufacturing a strip of unvulcanized rubber compound with short fibers mixed therein, comprises extruding a mixture of unvulcanized rubber and short fibers to form a strip of the mixture and to orient the short fibers towards the extruding direction, and piercing the strip with needles in a thickness direction of the strip to orient the short fibers towards the piercing direction.

BREIF DESCRIPTION OF THE DRAWINGS

An embodiment of the present invention will now be described in detail in conjunction with the accompanying drawings.

DETAILED DESCRIPTION

In this embodiment, a method of manufacturing a strip of unvulcanized rubber compound G according to the present invention is incorporated into a method of manufacturing a pneumatic tire (hereinafter, the "tire manufacturing method").

The tire manufacturing method comprises: making a strip of unvulcanized rubber compound G; building an unvulcanized tire by using the strip G; and vulcanizing the tire in a mold.

The strip of unvulcanized rubber compound G may be used to form various tire components, for example tread rubber, sidewall rubber, bead apex rubber and the like. In the undermentioned example, it is used to form the tread portion of the tire.

Figure 5:
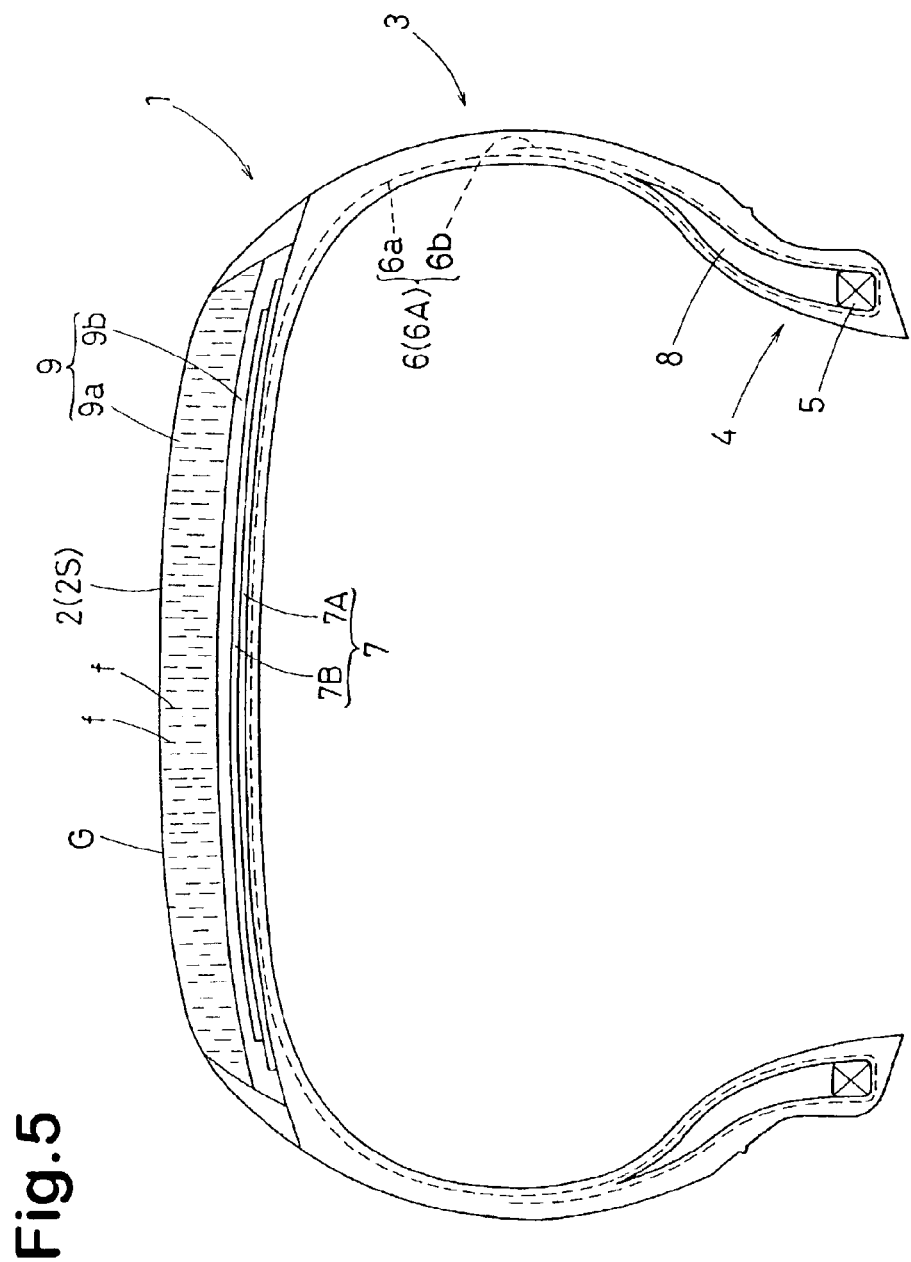
FIG. 5 is a schematic cross sectional view of a pneumatic tire manufactured in accordance with the invention.

An exemplary tire structure for a passenger car radial tire is shown in FIG. 5, wherein the tire 1 has a tread portion 2, a pair of sidewall portions 3 and a pair of bead portions 4, and is provided with a bead core 5 in each bead portion 4, a carcass 6 extending between the bead portions 4, and a belt 7 disposed radially outside the carcass 6 in the tread portion 2. The carcass 6 is composed of at least one ply 6A of cords arranged radially at an angle of from 75 to 90 degrees with respect to the tire circumferential direction. The carcass ply 6A extends between the bead portions 4 through the tread portion 2 and sidewall portions 3, and is turned up around the bead core 5 in each bead portion 4 so as to form a pair of turned up portions 6b and a main portion 6a therebetween. The carcass 6 in this example is composed of a single ply 6A of cords arranged radially at 90 degrees.

The bead portions 4 are each provided on the radially outside of the bead core 5 with a radially outwardly tapering bead apex rubber 8 wrapped in the turned up portion 6b and main portion 6. The belt 7 comprises at least two cross breaker plies 7A and 7B of high elastic modulus cords laid at an angle of from 10 to 35 degrees with respect to the tire circumferential direction. The belt 7 in this example is composed of two cross breaker plies 7A and 7B only.

On the radially outside of the belt 7, a tread rubber 9 is disposed. The tread rubber 9 in this example comprises a base tread rubber layer 9b disposed on the radially outside of the belt 7 and a cap tread rubber layer 9a disposed thereon to define the tread face 2s.

The cap tread rubber layer 9a is made of a rubber compound provided therein with bidirectionally oriented short fibers (f), wherein a certain percentage of the short fibers (f) are oriented in the tire radial direction and the remainder are generally oriented in the tire circumferential direction.

The cap tread rubber layer 9a is formed by winding the above-mentioned strip G of unvulcanized rubber compound around the tire in a process of building an unvulcanized tire. Thus, the rubber strip G used is such that about 10 to 30% of the short fibers (f) are oriented in the thickness direction of the strip and the remainder are oriented in the longitudinal direction of the strip.

Figure 1:
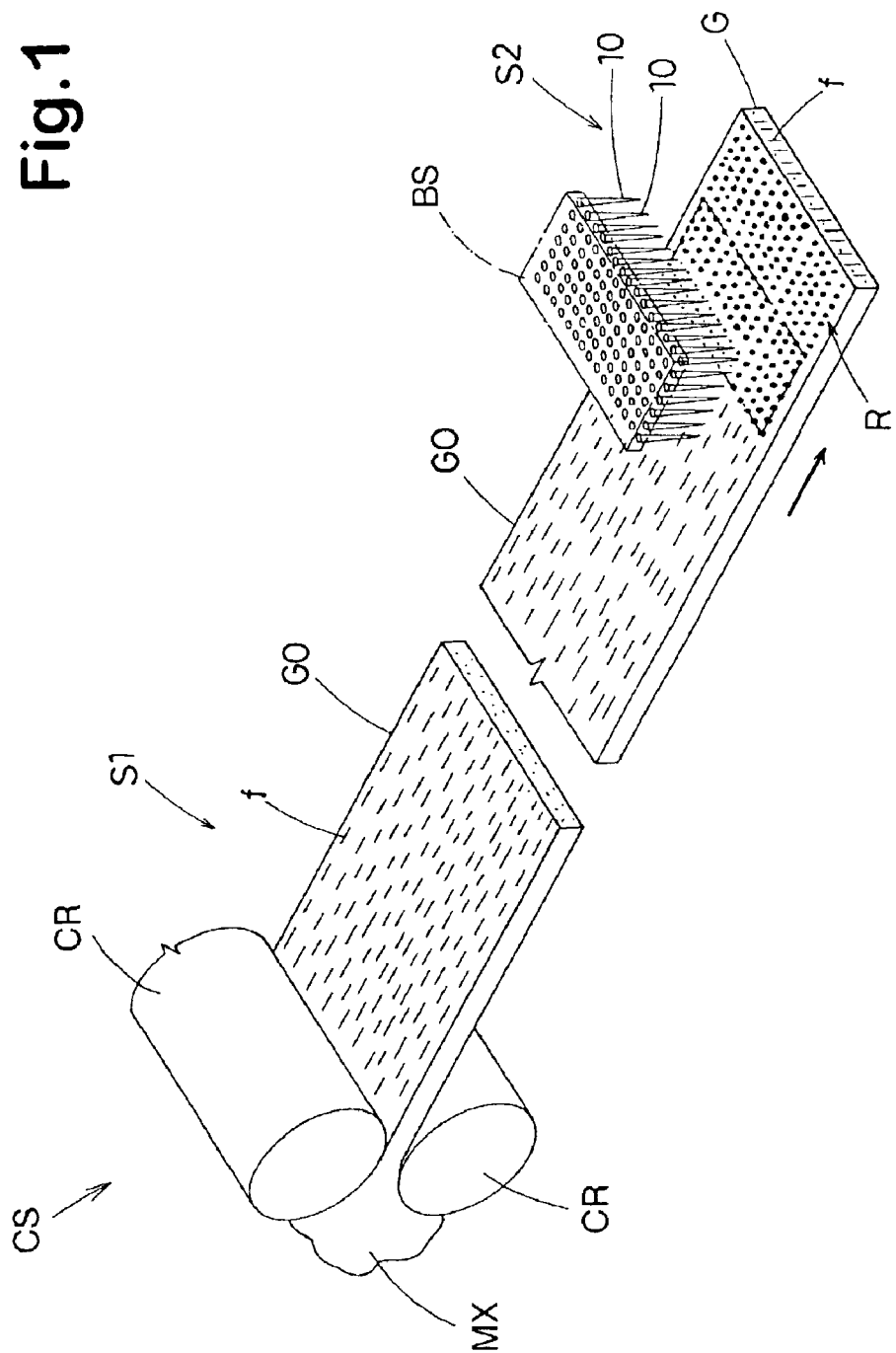
FIG. 1 is a diagram showing a method of manufacturing a strip of unvulcanized rubber compound according to the present invention.

FIG. 1 shows the method of manufacturing the rubber strip G.

In the first place, unvulcanized rubber and short fibers (f) are mixed, and the mixture (MX) is extruded into a billet through a nozzle of a die of an extruder (not shown), and the billet of the mixture (MX) passes through a nip or gap between rolls (CR) of a calender roll system (CS), whereby the short fibers (f) are almost oriented towards the extruding direction and the longitudinal direction of the material strip G0 at first. (hereinafter, the "first orienting process S1")

In the second place, the material strip G0 is pierced with needles 10 in a thickness direction to orient the short fibers (f) towards the piercing direction of the strip. (hereinafter, the "second orienting process S2")

The piercing direction may be aslant towards a certain direction. But, in case of the cap tread rubber layer 9a, the piercing direction is perpendicular to the surface of the strip G0.

Figure 2:
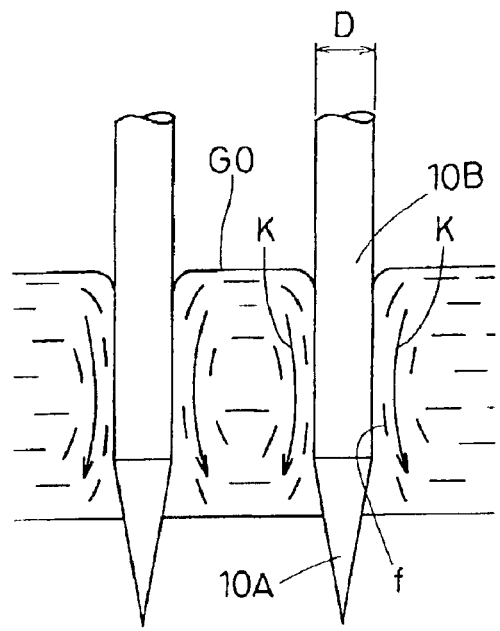
FIG. 2 is an enlarged schematic cross sectional view showing a process of orienting short fibers towards the thickness direction of the strip.

AS shown in FIG. 2, the needle 10 has a constant diameter D in the main portion 10B excepting the pointed end 10A. Preferably, the diameter D is set in a range of from 0.4 mm to 2.2 mm. In the example shown in FIG. 1, the needles 10 are implanted in a base BS like a needle point holder for flower arrangement.

The above-mentioned mixture (MX) includes, 1 to 40 parts by weight of fibers whose diameter is in a range of from 5 to 100 micrometer and length is in a range of from 200 to 400 micrometer, with respect to 100 parts by weight of the rubber base material.

As the short fibers (f), various fibrous material may be used, for example, organic fibers such as aromatic polyamide, vinylon, polyester, polyester, nylon, rayon and the like, inorganic fibers such as glass, carbon, graphite and metal, crystal whiskers of inorganic substance or organic substance such as polyoxymethylene, cis-1,2-polybutadiene, silicon carbide, tungsten carbide, alumina and the like.

The number N of positions pierced with the needles 10 is preferably set in a range of from 180 to 500 per 100 sq.mm when the needle diameter D is in a range of not less than 0.4 mm but less than 0.8 mm. when the needle diameter D is in a range of not less than 0.8 mm but not more than 2.2 mm, the number N is preferably set in a range of from 80 to 450 per 100 sq.mm.

Further, in order to effectively orient the short fibers towards the piercing direction, it is preferable that the temperature of the material rubber strip G0 is in a range of from 40 to 130 deg.C., preferably 40 to 100 deg.C. during piercing so that the rubber has mobility.

In the first orienting process S1, the short fibers (f) are generally oriented in the longitudinal direction of the strip. In the second orienting process S2, the rubber and short fibers (f) around the needle 10 follow the needle 10 and a local motion K towards the piercing direction occurs. After the needle 10 is pulled out, the hole disappears but the moved short fibers (f) remain. Accordingly, the short fibers (f) are oriented towards the piercing direction.

As a result, in the rubber strip G, a certain percentage of the short fibers (f) are oriented in the thickness direction of the strip and the remainder are generally oriented in the longitudinal direction of the strip, namely, the short fibers (f) are bidirectionally oriented.

In case of the cap tread rubber layer 9a, it is preferable that about 10 to 30% of the short fibers (f) are oriented in the thickness direction of the strip in the ground contacting part. In other words, it is not always necessary that all the surface of the strip G0 is pierced. It is possible to pierce a required region only, for example, a region which comes into contact with the ground.

Figure 3:
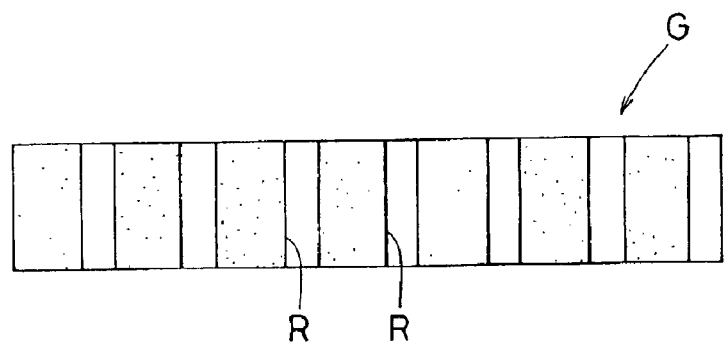
FIGS. 3 and 4 are plan views each showing another example of the strip of unvulcanized rubber compound.

FIG. 3 shows another example of the strip G, wherein the pierced region R is discontinuous in the longitudinal direction and each region R extends across the entire width.

Figure 4:
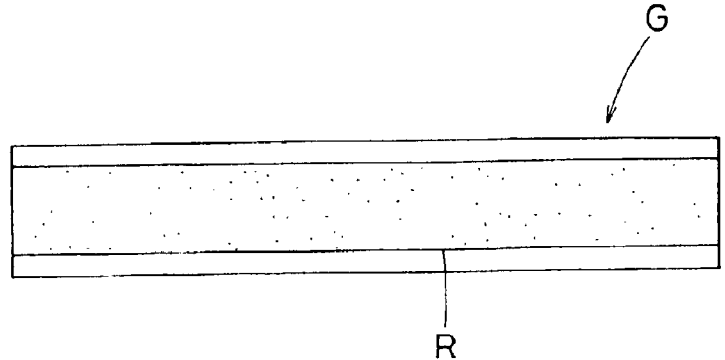

FIG. 4 shows still another example of the strip G, wherein the pierced region R is continuous in the longitudinal direction but each edge part is not pierced.

It is not always necessary that the number N is constant through the pierced region R. It can be varied to obtain a desired orientation percentage according to the position.

In the method of building an unvulcanized tire, a characterizing feature may be a process of making the tread portion 2 by winding or applying the above-mentioned strip. The other processes and the process of vulcanizing the tire may be conventional, therefore, the descriptions thereof are omitted.

Confirmation Test

Using a material rubber strip G0 having a thickness of 4 mm and including 20 parts by weight of short fibers (diameter 10 micrometer, length 400 micrometer) with respect to 100 parts by weight of the rubber base material, the percentage Y of orientation towards the thickness direction was obtained by changing the diameter D of needle and the number N of pierced points. The results are shown in the following Table 1 and plotted in FIG. 6.

Further, by changing the temperature only, the percentage Y was obtained. The results are shown in Table 2.

TABLE 1

| Sample | Temp. (deg. C.) | D (mm) | N | Y (%) |
| --- | --- | --- | --- | --- |
| 1 | 25 | 0.4 | 100 | 0.0 |
| 2 | 25 | 0.4 | 200 | 9.2 |
| 3 | 25 | 0.4 | 400 | 10.7 |
| 4 | 25 | 0.4 | 500 | 10.9 |
| 5 | 25 | 0.4 | 600 | 10.8 |
| 6 | 25 | 0.8 | 100 | 11.0 |
| 7 | 25 | 1.0 | 100 | 11.1 |
| 8 | 25 | 1.0 | 200 | 13.3 |
| 9 | 25 | 1.0 | 400 | 22.9 |
| 10 | 25 | 1.0 | 500 | 23.0 |
| 11 | 25 | 1.0 | 600 | 22.7 |
| 12 | 25 | 2.2 | 100 | 8.9 |
| 13 | 25 | 2.2 | 200 | 10.1 |
| 14 | 25 | 2.2 | 400 | 10.9 |
| 15 | 25 | 2.2 | 500 | 10.9 |
| 16 | 25 | 2.2 | 600 | 11.0 |

TABLE 2

| Sample | Temp. (deg. C.) | D (mm) | N | Y (%) |
| --- | --- | --- | --- | --- |
| A | 25 | 1.0 | 400 | 22.9 |
| B | 40 | 1.0 | 400 | 25.9 |
| C | 50 | 1.0 | 400 | 26.2 |
| D | 70 | 1.0 | 400 | 27.8 |
| E | 100 | 1.0 | 400 | 28.0 |
| F | 130 | 1.0 | 400 | 23.0 |
| G | 150 | 1.0 | 400 | 13.4 |

Figure 6:
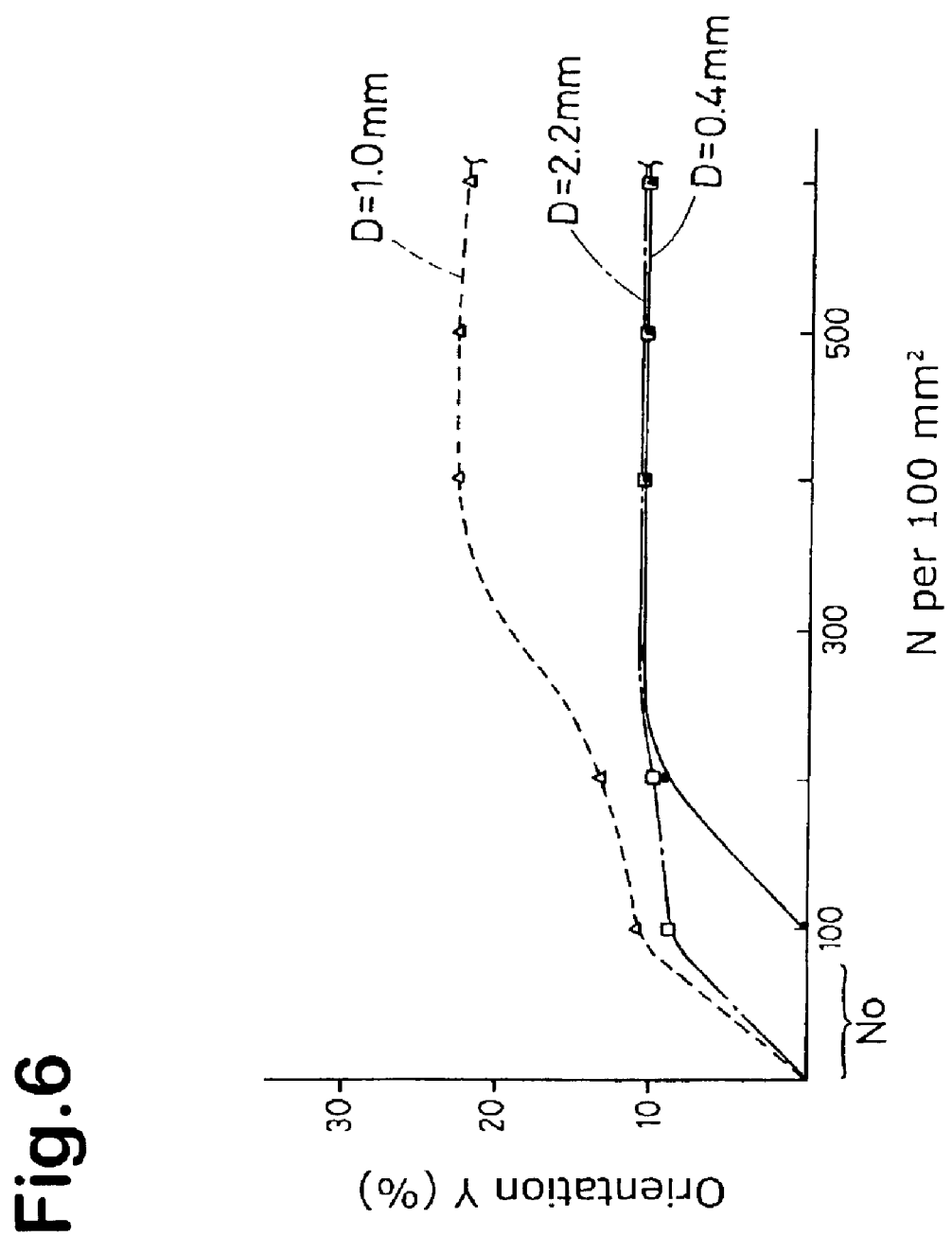
FIG. 6 is a graph showing a relationship between the orientation percentage Y, the number N of priced points and needle diameter D.
Figure 7:
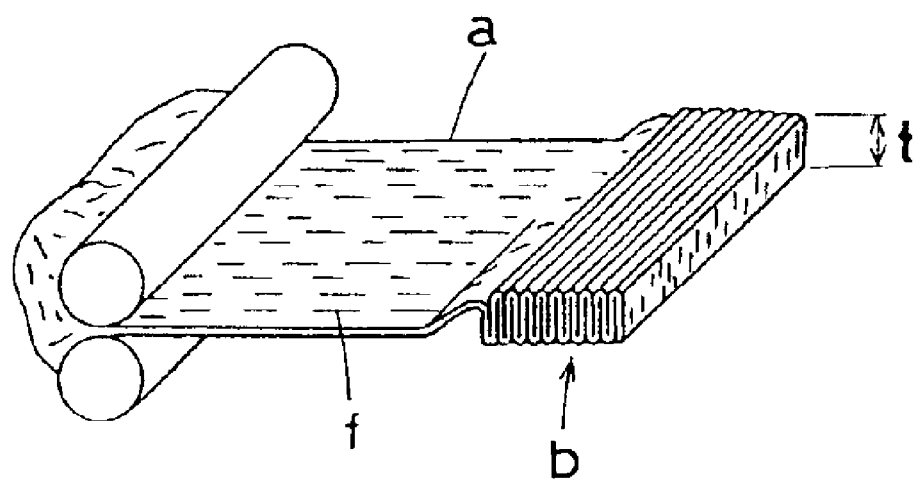
FIG. 7 shows a method of making a relatively thick strip of unvulcanized rubber in which short fibers are oriented towards the thickness direction of the strip.

As shown in Tables 1 and 2 and FIG. 6, it is possible to control or adjust the orientation percentage by changing the number N, diameter D and/or temperature. Therefore, this also provides a method of providing directional property for rubber articles such as directional elastic modulus, directional rigidity and the like.

What is claimed is:

1. A method of manufacturing a strip of unvulcanized rubber compound with short fibers mixed therein, comprising:

extruding a mixture of unvulcanized rubber and short fibers to form a strip of the mixture and to orient the short fibers towards the extruding direction, and piercing the strip with needles having a diameter of from 0.8 to 2.2 mm to make through-holes in a thickness direction of the strip and then pulling out the needles so that the through-holes disappear, whereby the short fibers adjacent to the needles are oriented towards the piercing direction.

2. The method according to claim 1, which further comprises adjusting the temperature of the strip at a certain value in a range of from 40 to 130 deg. C. during piercing the strip with the needles.

3. The method according to claim 1 or 2, wherein the number of the pierced points is in a range of from 80 to 450.

4. A method of manufacturing a pneumatic tire comprising:

making a strip of unvulcanized rubber compound, building an unvulcanized tire by using the strip, and vulcanizing the tire in a mold, wherein the process of making a strip of unvulcanized rubber compound comprises extruding a mixture of unvulcanized rubber and short fibers to form a strip of the mixture and to orient the short fibers towards the extruding direction, and piercing the strip with needles having a diameter of from 0.8 to 2.2 mm to make through-holes in a thickness direction of the strip and then pulling out the needles so that the through-holes disappear, whereby the short fibers adjacent to the needles are oriented towards the piercing direction.

5. The method according to claim 1, wherein each said needle has a constant diameter in its main portion excepting a pointed end.

6. The method according to claim 4, wherein each said needle has a constant diameter in its main portion excepting a pointed end.

\* \* \* \* \*